Figure 4:
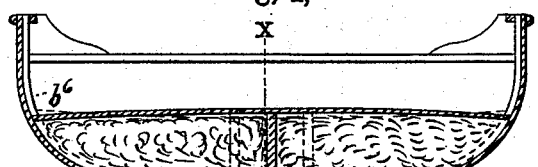

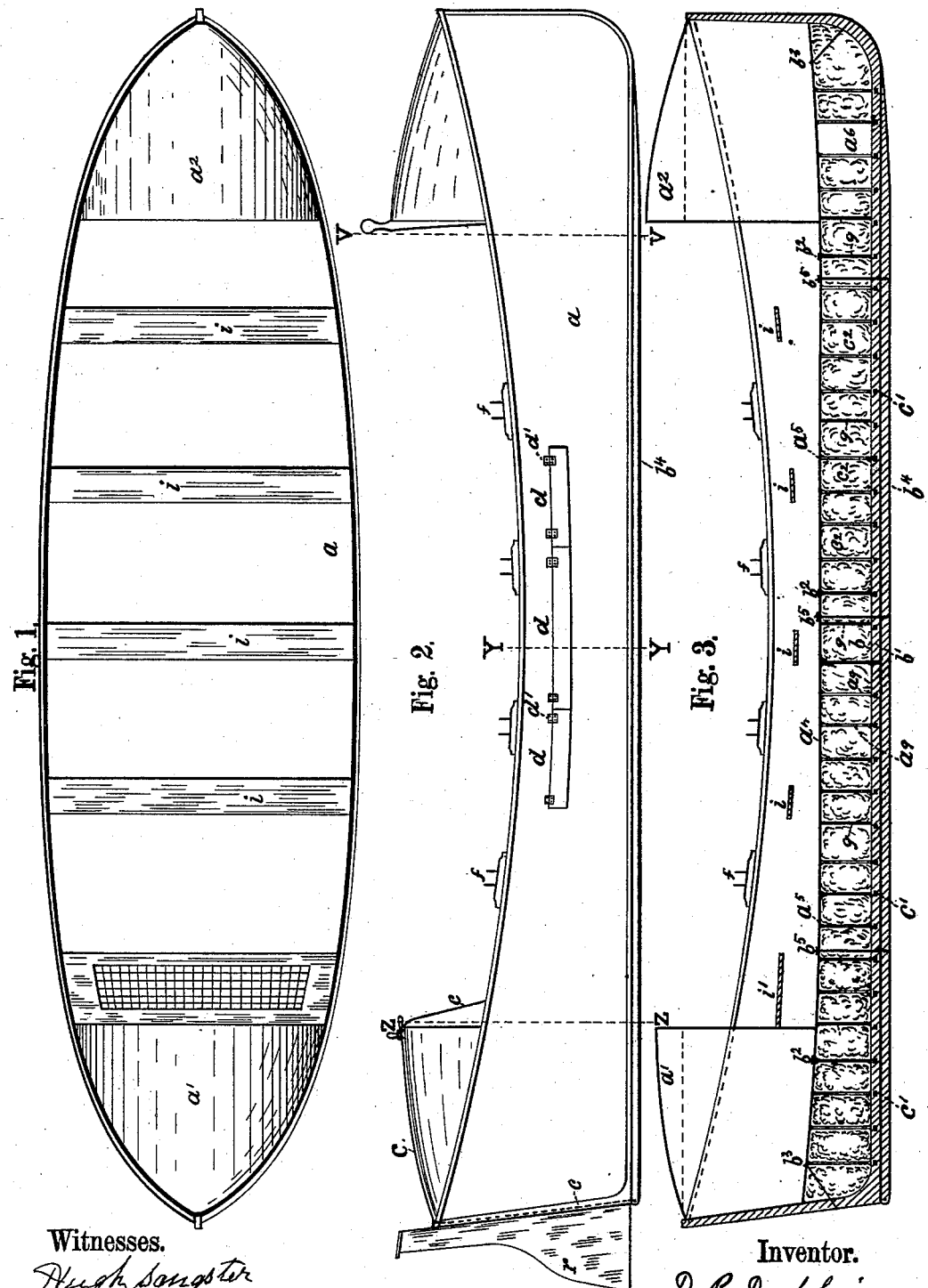

(No Model.) 2 Sheets—Sheet 2.

D. P. DOBBINS.
LIFE BOAT.

No. 316,881. Patented Apr. 28, 1885.

Witnesses.
Hugh Sangster
Jennie M. Caldwell

Inventor.
David P. Dobbins
By James Sangster
Atty.

N. PETERS, Photo-Lithographer, Washington, D. C.

UNITED STATES PATENT OFFICE.

DAVID P. DOBBINS, OF BUFFALO, NEW YORK.

LIFE-BOAT.

SPECIFICATION forming part of Letters Patent No. 316,881, dated April 28, 1885.

Application filed May 26, 1884. (No model.)

*To all whom it may concern:*

Be it known that I, DAVID P. DOBBINS, a citizen of the United States, residing in Buffalo, in the county of Erie and State of New York, have invented certain new and useful Improvements in Life Boats, of which the following is a specification.

The object of my invention is to produce a portable and efficient unsubmergeable, self-righting, and self-bailing life-boat, which shall combine lightness and strength with perfect security and sea-worthiness, and which can be easily transported from place to place overland, and launched by hand from the beach through the surf or off the deck of a sail or steam vessel without being liable to be swamped, sunk, or disabled by bilging or staving in contact with obstructions of any kind, and which will immediately recover an upright position, if capsized, and be capable of quickly freeing itself of any amount of water that may be shipped or taken in from a "boarding sea" or in the act of righting; and the invention consists of a life-boat, sharp or square stern, carval or clinch built, the hull, under cover, being lined in whole or in part with strong heavy canvas or other equivalent material to protect it from penetration, and bulkheads further divide the hold into transverse water-tight compartments, which are covered with a water-tight deck extending the full length of the boat. On top of the deck, at each end, are raised turtle-back air-cases for preventing the boat from capsizing and righting the same if capsized, and fitted with man-holes and spring-hinged scuppers adapting them to receive and hold passengers or stores in security from exposure to the weather, that portion of the boat below the deck or load water-line being entirely stowed or fitted with buoyant ballast, such as cork or other light material, in sacks of strong canvas or other equivalent material, made water-proof, excluding all air-space under the deck. When cork is used, it may be either in the form of sheet-cork, cork chips, cork shavings, or granulated cork, and, if required, the cork or other light material, in either form, may be made water-proof by means of paraffine or other suitable waterproofing material; and, if desired, the lower or bottom part of the hold may be filled, or partly filled, with water-ballast in metallic or other cases, self-filling and self-delivering, and the balance of the hold fitted with cork, &c., as before stated. In the waists above the deck are fitted spring-hinge waist-ports or delivery-scuppers for the easy escape of water off the deck, as will more fully appear by reference to the accompanying drawings, in which—

Figure 5:
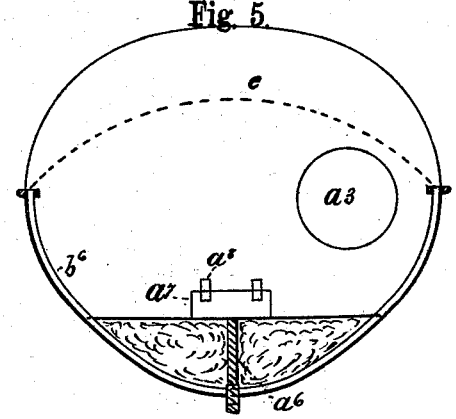
Figure 6:
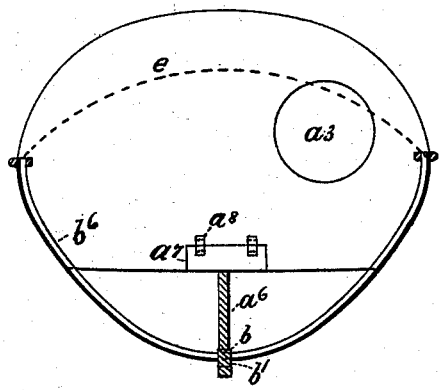
Figure 7:
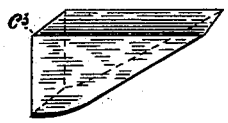

Figure 1 is a plan or top view. Fig. 2 represents a side elevation of the boat complete. Fig. 3 is a vertical longitudinal section through line X X, Fig. 4. Fig. 4 is a vertical cross-section in line Y Y, Fig. 2. Fig. 5 is a vertical cross-section in line Z Z, Fig. 2. Fig. 6 represents a vertical cross-section through line V V, Fig. 2; and Fig. 7 is a perspective view of the canvas sack for holding the cork shavings or other light material.

$a$ represents the hull of the boat. $a'$ $a^2$ are the air-cases, which are lined inside with heavy, strong canvas rendered water-proof. They are built in with the boat so as to be light, strong, and durable. At the end of each case is placed a hinged door or man-hole, $a^3$.

$a^7$ represents the spring-hinge scuppers. They are arranged so as to open outward, and should any water get in the air-case it will open them and pass out, when the doors or scuppers will immediately spring shut.

$a^8$ is the spring hinges, made in any well-known way for the purpose designed. The object of these doors or man-holes is to provide an opening through which passengers or anything else may be placed in the air-cases when desired.

The deck $a^4$ runs the whole length of the boat, and is supported by the water-tight compartment bulkheads $a^5$, (of which there may be more or less than the number shown,) and the rider, keelson, or strong back $a^6$.

The compartments $g$ are so arranged on each side of the strong back, and are fitted (so as to exclude all air-space as much as practicable) with some light material—such as cork or its equivalent, $c^2$. I also inclose the cork (or other light material) in water-tight bags $c^3$, (see Fig. 7,) made of strong, heavy canvas or other similar flexible material. These bags or sacks are made the exact shape or form, so as to adapt them to fit their proper place in the hold of the boat. Of course it will be seen that different parts of the boat require a different form or shape of bag or sack. Each sack should be rendered waterproof by placing it in a tanning-vat for a short time (this operation also renders it more lasting), after which they are filled with cork or other light material, as above mentioned, and, if desired. they may be subjected (after being in tanning-vat) to the action of some waterproofing material, or they may be dipped in a resinous material and oil so tempered or mixed as to be flexible, the object being to have a strong, flexible water-proof case for holding cork or other light or buoyant material, sufficiently strong to prevent penetration by staving, so that the boat will be buoyant and capable of supporting a load, although her sides or bottom may be broken in.

The scuppers $d$ are hung upon hinges $d'$, provided with springs made in any well-known way, and constructed so that water thrown into the boat will force the scuppers open and pass out, after which they will immediately spring shut again, thereby acting automatically.

In a ship's life-boat I use a lower air-case, something similar to that shown by the dotted lines $e$ in Figs. 5 and 6. To counterbalance this change, I use a heavier keel, the extra weight of keel in a ship's life-boat not being so objectionable as it would be in a surf life-boat.

I make no claim in this application for the peculiar construction of the boat relating to the perforated keel and keelson with ribs running from gunwale to gunwale or the strong back and other devices for giving additional strength, as I shall make these the subject of a separate application.

I claim as my invention—

1. A life-boat having the interior of the hold below the deck covered with a lining of strong canvas, in combination with a series of waterproof canvas sacks arranged below the water-line and filled with cork or other bouyant material, each sack being shaped so as to adapt it to conform to its position in the interior of the hold and to practically fill the portion in which it is placed, substantially as and for the purposes described.

2. A life-boat provided with air-cases $a'$ $a^2$, each having an interior lining of strong waterproof canvas, a man-hole, $a^3$, and spring-hinged valves or scuppers $a^7$, arranged at the bottom of the case, and adapted to open outward if any water should get into the case and to spring shut as soon as the water leaves it, substantially as specified.

3. A life-boat, the hold of which is filled with cork having air-cases above the deck provided with man-holes and spring-hinged scuppers, and having spring-hinged scuppers arranged in each side of the boat, whereby the boat is rendered unsubmergeable and the water shipped will be discharged through the scuppers, substantially as described.

DAVID P. DOBBINS.

Witnesses:

JENNIE M. CALDWELL,
JAMES SANGSTER.